(12) United States Patent
Liu

(10) Patent No.: US 11,945,457 B2
(45) Date of Patent: Apr. 2, 2024

(54) METHOD FOR DATA ANALYSIS, ELECTRONIC DEVICE, AND COMPUTER READABLE MEDIUM

(71) Applicant: LAUNCH TECH CO., LTD., Shenzhen (CN)

(72) Inventor: Xin Liu, Shenzhen (CN)

(73) Assignee: LAUNCH TECH CO., LTD., Shenzhen (CN)

( * ) Notice: Subject to any disclaimer, the term of this patent is extended or adjusted under 35 U.S.C. 154(b) by 854 days.

(21) Appl. No.: 17/044,588

(22) PCT Filed: Feb. 26, 2020

(86) PCT No.: PCT/CN2020/076759
§ 371 (c)(1),
(2) Date: Oct. 1, 2020

(87) PCT Pub. No.: WO2020/173458
PCT Pub. Date: Sep. 3, 2020

(65) Prior Publication Data
US 2021/0024080 A1 Jan. 28, 2021

(30) Foreign Application Priority Data
Feb. 27, 2019 (CN) .......................... 201910147946.3

(51) Int. Cl.
*H04W 4/46* (2018.01)
*B60W 40/09* (2012.01)
(Continued)

(52) U.S. Cl.
CPC ............ *B60W 50/14* (2013.01); *B60W 40/09* (2013.01); *G06V 20/56* (2022.01); *H04L 9/0643* (2013.01);
(Continued)

(58) Field of Classification Search
CPC ................ B60W 40/09; B60W 50/14; B60W 2050/143; G06C 20/56; H04L 9/0643; H04L 9/50; H04W 4/46
See application file for complete search history.

(56) References Cited

U.S. PATENT DOCUMENTS

2018/0061237 A1 3/2018 Erickson et al.
2018/0137742 A1* 5/2018 Zhang .................... G08B 21/02
(Continued)

FOREIGN PATENT DOCUMENTS

CN          105243838 A        1/2016
CN          105488376 A        4/2016
(Continued)

OTHER PUBLICATIONS

The Extended European Search Report issued corresponding EP Application No. EP20763210.0 dated Nov. 2, 2021.
(Continued)

*Primary Examiner* — Dale Moyer
(74) *Attorney, Agent, or Firm* — HAUPTMAN HAM, LLP

(57) ABSTRACT

A method for data analysis, an electronic device, and a computer readable storage medium are provided. The method includes the following. A trip order is obtained. A smart contract is generated based on the trip order. Trip data uploaded by an on-board equipment is obtained. The smart contract is triggered based on the trip data and the trip order. Early-warning which corresponds to the smart contract is performed.

12 Claims, 3 Drawing Sheets

(51) Int. Cl.
*B60W 50/14* (2020.01)
*G06V 20/56* (2022.01)
*H04L 9/06* (2006.01)
*H04L 9/00* (2022.01)

(52) U.S. Cl.
CPC ........ *H04W 4/46* (2018.02); *B60W 2050/143* (2013.01); *H04L 9/50* (2022.05)

(56) References Cited

U.S. PATENT DOCUMENTS

| | | | |
|---|---|---|---|
| 2018/0211543 A1 | 7/2018 | Wei | |
| 2018/0342036 A1* | 11/2018 | Zachary | H04W 4/44 |
| 2018/0372502 A1* | 12/2018 | Rønnow | G01C 21/3446 |
| 2021/0081930 A1* | 3/2021 | Rode | G06Q 20/325 |

FOREIGN PATENT DOCUMENTS

| | | |
|---|---|---|
| CN | 105721695 A | 6/2016 |
| CN | 106056839 A | 10/2016 |
| CN | 106373331 A | 2/2017 |
| CN | 108765930 A | 11/2018 |
| CN | 109087409 A | 12/2018 |
| CN | 109194710 A | 1/2019 |
| CN | 109255252 A | 1/2019 |
| CN | 109637082 A | 4/2019 |
| CN | 109993330 A | 7/2019 |
| WO | 2017190794 A1 | 11/2017 |

OTHER PUBLICATIONS

The International Search Report issued corresponding PCT application No. PCT/CN2020076759 dated May 26, 2020.

* cited by examiner

METHOD FOR DATA ANALYSIS, ELECTRONIC DEVICE, AND COMPUTER READABLE MEDIUM

CROSS-REFERENCE TO RELATED APPLICATION(S)

This disclosure claims priority to Chinese Patent Application No. 201910147946.3, filed on Feb. 27, 2019, and entitled "METHOD FOR DATA ANALYSIS, ELECTRONIC DEVICE, AND COMPUTER READABLE MEDIUM", the entire disclosure of which is hereby incorporated by reference.

TECHNICAL FIELD

This disclosure relates to the field of blockchain technology, and particularly to a method for data analysis, an electronic device, and a computer readable medium.

BACKGROUND

In the existing travel scenarios, online ride-hailing taxis or cars (in the following, "online car" for short) are randomly matched by a system, that is, drivers and passengers are randomly matched to achieve a journey together. Due to characteristics of random matching, a driver and a passenger matched to the driver do not know each other. As a result, violations of personal safety and property safety of drivers or passengers often occur in this case. The random matching brings certain safety risks to both drivers and passengers. However, the existing alarm mechanism needs to wait until a victim or relatives of the victim call the police, resulting in a relatively poor timeliness of the alarm. In addition, the existing alarm mechanism cannot effectively avoid occurrence of violations.

SUMMARY

According to implementations of the present disclosure, a method for data analysis is provided, which can effectively and timely reduce safety risks of drivers or passengers when traveling by an online car.

In a first aspect of the present disclosure, a method for data analysis is provided. A trip order is obtained and a smart contract is generated based on the trip order. Trip data uploaded by an on-board equipment is obtained. The smart contract is triggered based on the trip data and the trip order. Early-warning which corresponds to the smart contract is performed.

In one implementation, triggering the smart contract based on the trip data and the trip order and performing the early-warning which corresponds to the smart contract are as follows. Whether a deviation between a driving route and a preset navigation route contained in the trip order exceeds a first threshold is determined based on the trip data. Upon determining that the deviation between the driving route and the preset navigation route exceeds the first threshold, the smart contract is triggered and a monitoring instruction is sent to the on-board equipment, where the monitoring instruction is used to activate a monitoring equipment of a vehicle.

In one implementation, the method further includes the following after sending the monitoring instruction to the on-board equipment. Monitoring information sent by the on-board equipment is received. When the monitoring information contains information indicating danger, the smart contract is triggered, private information contained in the trip order is disclosed, and the private information and the trip data are uploaded to a police platform, where the private information includes driver information, passenger information, and emergency contact information.

In one implementation, when the monitoring information contains information indicating danger, whether an absolute value of acceleration in the trip data is greater than a second threshold is determined. Upon determining that the absolute value of the acceleration in the trip data is greater than the second threshold, the smart contract is triggered and an alarm start instruction is sent to the on-board equipment, where the alarm start instruction is used to instruct the on-board equipment to send warning information to surrounding vehicles.

In one implementation, the method further comprises the following after obtaining the trip order. Actual image information of a driver sent by the on-board equipment is received. Whether the actual image information is consistent with pre-stored image information of the driver is determined, where the pre-stored image information is a pre-stored image of the driver corresponding to driver information contained in the trip order. Upon determining that the actual image information is inconsistent with the pre-stored image information, warning information is sent to an electronic device of a passenger.

In a second aspect of the present disclosure, an electronic device is provided. The electronic device includes a generating unit, an obtaining unit, and a performing unit. The generating unit is configured to obtain a trip order and generate a smart contract based on the trip order. The obtaining unit is configured to obtain trip data uploaded by an on-board equipment. The performing unit is configured to trigger the smart contract based on the trip data and the trip order, and perform early-warning which corresponds to the smart contract.

In one implementation, the performing unit includes a determining subunit and a sending subunit. The determining subunit is configured to determine, based on the trip data, whether a deviation between a driving route and a preset navigation route contained in the trip order exceeds a first threshold. The sending subunit is configured to trigger the smart contract and send a monitoring instruction to the on-board equipment, upon determining that the deviation between the driving route and the preset navigation route exceeds the first threshold, where the monitoring instruction is used to activate a monitoring equipment of a vehicle.

In one implementation, the performing unit further includes a receiving subunit and a disclosing subunit. The receiving subunit is configured to receive monitoring information sent by the on-board equipment. The disclosing subunit is configured to trigger the smart contract and disclosing the trip order, when the monitoring information contains information indicating danger. The sending subunit is further configured to trigger the smart contract and upload the trip order and the trip data to a police platform, when the monitoring information contains information indicating danger.

In one implementation, the determining subunit is configured to determine whether an absolute value of acceleration in the trip data is greater than a second threshold when the monitoring information contains information indicating danger. The sending subunit is further configured to trigger the smart contract and send an alarm start instruction to the on-board equipment, upon determining that the absolute value of the acceleration in the trip data is greater than the second threshold, where the alarm start instruction is used to instruct the on-board equipment to send warning information to surrounding vehicles.

In one implementation, the electronic device further includes a receiving unit, a determining unit, and a sending unit. The receiving unit is configured to receive actual image information of a driver sent by the on-board equipment. The determining unit is configured to determine whether the actual image information of the driver is consistent with pre-stored image information of the driver, where the pre-stored image information is a pre-stored image of the driver corresponding to driver information contained in the trip order. The sending unit is configured to send warning information to an electronic device of a passenger, upon determining that the actual image information is inconsistent with the pre-stored image information.

In a third aspect of the present disclosure, an electronic device is further provided. The electronic device includes a processor, a memory configured to store program codes, and a communication module configured to call the program codes. The program codes, when executed by the processor, cause the processor to execute the method described in the first aspect and any implementation form thereof.

In a fourth aspect of the present disclosure, a computer readable storage medium is provided. The computer readable storage medium is configured to store computer programs. The computer programs includes program instructions, when executed by a processor, cause the processor to execute the method described in the first aspect and any implementation form thereof.

As can be seen, in the implementations of the present disclosure, the trip order is obtained and the smart contract is generated based on the trip order. Then the trip data uploaded by the on-board equipment is obtained. The smart contract is triggered based on the trip data and the trip order, and early-warning which corresponds to the smart contract is performed. By adopting technical solutions of the present disclosure, a smart contract for automatic early-warning can be generated based on a trip order of a passenger. Trip data of an online car can be obtained in real time. Whether to trigger an event in the smart contract is determined based on the real-time trip data and the trip order (i.e., there may be a security risk). If it is determined that there is a security risk, the smart contract is triggered and early-warning corresponding to the smart contract is performed. In this way, a safety risk of the passenger or the driver of the online car can be effectively and timely reduced.

DETAILED DESCRIPTION

Figure 1:
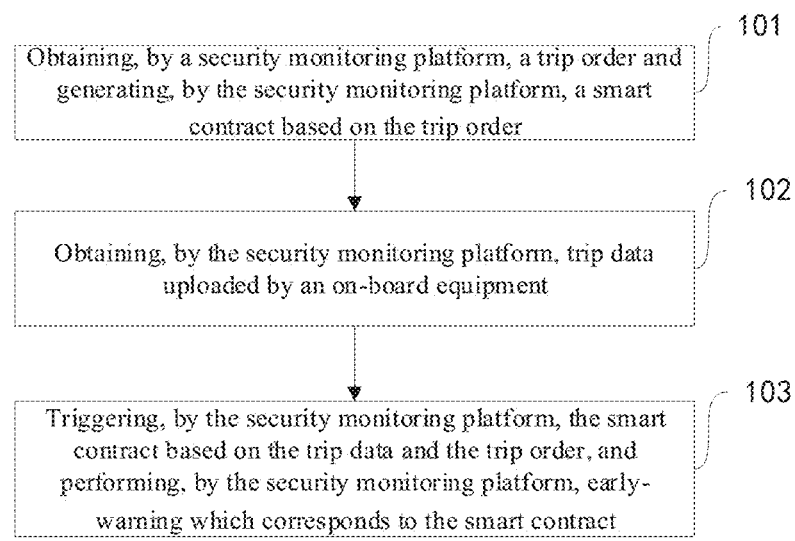
FIG. 1 is a schematic flowchart illustrating a method for data analysis according to some implementations.

Hereinafter, technical solutions embodied by implementations of the present disclosure will be described in a clear and comprehensive manner with reference to accompanying drawings intended for the implementations.

The terms "include", "comprise", and "have" as well as variations thereof used in the specification and the claims of the present disclosure are intended to indicate the presence of described features, wholes, steps, operations, elements, and/or components, but do not exclude the presence or addition of one or more other features, wholes, steps, operations, elements, components, and/or combinations thereof.

The terms used in the specification and the claims of the present disclosure are merely for the purpose of describing particular implementations and are not intended to limit the present disclosure. As used in the specification and the claims of the present disclosure, unless the context clearly indicates otherwise, the terms "a/an", "one" and "the" in a singular form may also include a plural form.

The term "and/or" used in the specification and the claims of the present disclosure refers to any and all possible combinations of one or more of the associated listed items and includes these combinations.

As used in the specification and the claims of the present disclosure, the term "if" in the context may be interpreted as "when", "once", "in response to determining that", or "in response to detecting that" Similarly, the term "when determining that" or "when detecting that [described condition or event]" may be interpreted in the context to mean "once determining that", "in response to determining", "once detecting that [described condition or event]", or "in response to detecting that [the described condition or event]".

Blockchain is a chained data structure in which data blocks are sequentially connected in a chronological order and is a cryptographically guaranteed tamper-proof and unforgeable distributed ledger.

The characteristics of the blockchain are openness, consensus, decentralization, demisting, transparency, anonymity of both parties, tamper-proof, and provenance. The openness and transparency mean that anyone can participate in a blockchain network, each device can serve as a node, and each node is allowed to obtain a complete copy of a database. Nodes are based on a consensus mechanism to jointly maintain the entire blockchain through competitive calculations. If any node fails, remaining nodes can still work normally. The decentralization and demisting mean that the blockchain is composed of many nodes to form an end-to-end network, and there is no centralized equipment and management organization. Data exchange between nodes is verified by using digital signature technology, and no mutual trust between nodes. The Data exchange between nodes only needs to be carried out according to established rules of a system, so one of the nodes are unable to and cannot deceive other nodes. The transparency and anonymity of both parties mean that operating rules of the blockchain are public, all data information is also public, and so every transaction is visible to all nodes. Since nodes are detrusted, there is no need to disclose identity of each node among nodes, and each participating node is anonymous. The tamper-proof and provenance mean that modification of a database by each or even multiple nodes cannot affect databases of other nodes, unless more than 50% of the nodes in the entire network can be controlled to modify at the same time, which is almost impossible to happen. In the blockchain, every transaction is stored in two adjacent blocks connected in series which are chained together through cryptography, and so any transaction record can be traced back.

In the blockchain, data verification and storage can be achieved with the help of a chained data structure, data generation and update can be achieved by using distributed node consensus algorithms, and security of data transmission and access can be guaranteed by using cryptography, a brand new distributed infrastructure and computing method which can program and manipulate data based on a smart contract composed of automated script codes can be implemented. Therefore, the characteristic of tamper-proof of blockchain technology has fundamentally changed a centralized credit creation method, and effectively improves immutability and security of data. Since all terms in the smart contract are written as programs, these terms can be automatically executed on the blockchain, which can ensure that the blockchain can force relevant operations to be performed based on contents of the smart contract without any external force blocking when a condition of the smart contract is triggered. In this way, validity and execution of the smart contract can be guaranteed, thus greatly reducing costs and improving efficiency, Each node on the blockchain has the same ledger, which can ensure that a recording process of the ledger is open and transparent. Blockchain technology can achieve a point-to-point, open and transparent direct interaction, which makes efficient, large-scale, decentralized agent information interaction method become a reality.

Implementations of the present disclosure are applicable to blockchain node electronic devices. The blockchain node electronic device includes many types of devices and can be traditional electronic devices, large storage systems, desktop computers, laptop computers, tablet computers, palmtop computers, smart phones, portable digital players, smart watches, smart bracelets, etc. The blockchain node electronic device is an electronic device determined from electronic devices in the blockchain network according to a consensus mechanism. It should be understood that, since the blockchain is a decentralized distributed database, each time data is processed, an electronic device needs to be selected from the electronic devices in the blockchain network as an execution body to process the data. A rule for selecting an electronic device each time is the consensus mechanism. The consensus mechanism of the implementations of the present disclosure may be a proof of work (POW) mechanism, a proof of stake (POS) mechanism, and a ripple consensus mechanism, and delegated proof of stake (DPOS) mechanism, which is not limited herein. In implementations of the present disclosure, the terminal includes, but is not limited to, a device with a communication function, a smart phone, a tablet computer, a laptop computer, a desktop computer, a portable digital player, a smart bracelet, and a smart watch.

Currently, online cars are randomly matched by a system, that is, drivers and passengers are randomly matched to achieve a journey together. Due to characteristics of random matching, a driver and a passenger matched to the driver do not know each other. As a result, violations of personal safety and property safety of drivers or passengers often occur in this case. The random matching brings certain safety risks to both drivers and passengers. However, the existing alarm mechanism needs to wait until a victim or relatives of the victim call the police, resulting in a relatively poor timeliness of the alarm. In addition, the existing alarm mechanism cannot effectively avoid occurrence of violations.

According to the present disclosure, a method for trip safety alarm based on data analysis is provided. Data related to a driver, a passenger, a (current) driving location, (current) speed, (current) acceleration, and so on during a trip is monitored. A safety level of the trip is automatically analyzed. Early-warning is proposed. When a certain condition is satisfied, a blockchain smart contract is automatically triggered to notify relevant personnel. In this way, the safety of the trip can be improved.

A security monitoring platform is first established with the help of blockchain technology. Then, drivers and passengers register on the security monitoring platform through their own electronic devices to obtain their respective registration identities, and upload their respective emergency contact information to the security monitoring platform. Taking a scenario of a passenger riding an online car as an example, if the security monitoring platform monitors that the passenger or a driver of the online car is in danger, a smart contract is triggered, and alarm information is sent to an emergency contact of the driver or the passenger according to a specific dangerous event.

In implementations of the present disclosure, the security monitoring platform can run on each node of a blockchain network. The security monitoring platform is configured to automatically obtain a trip order of a passenger when the passenger takes an online car, and automatically generate a smart contract based on the trip order. During the passenger takes the online car, the security monitoring platform is configured to obtain trip data of the online car in real time, and analyze the trip data to determine whether a security event that triggers the smart contract occurs. If the security event occurs, the smart contract is triggered and early-warning preset in the smart contract is performed. In this way, early-warning can be performed in time upon determining that the passenger or the driver is in danger during the passenger takes the online car, which can avoid occurrence of tragedy to a certain extent.

FIG. 1 is a schematic flowchart illustrating a method for data analysis according to some implementations. As illustrated in FIG. 1, the method includes the following.

At 101, a security monitoring platform obtains a trip order and generates a smart contract based on the trip order.

The trip order herein may include driver information, passenger information, vehicle information, a departing place and a destination, a preset navigation route, estimated driving time, etc. The security monitoring platform may obtain the trip order through order transaction information of the driver or the passenger on a blockchain network, or may receive the trip order through actively reporting by the driver or the passenger on electronic devices of the driver or the passenger.

In implementations of the present disclosure, when a passenger is monitored booking an online car, the security monitoring platform automatically obtains a trip order of the passenger according to order transaction uploaded on the blockchain network, or receives the trip order actively uploaded by electronic devices of the driver or the passenger. Then the security monitoring platform automatically generates a smart contract based on the trip order. The role of the smart contract is to trigger the smart contract when determining that a security event occurs based on trip data of the online car obtained in real time during the passenger takes the online car, and perform pre-warning preset in the smart contract.

The smart contract herein may include two parts. A first part of the smart contract includes description codes of an operation event to-be-executed in the smart contract. In one implementation, the operation event is sending a monitoring instruction to an on-board equipment of the online car taken by the passenger, to obtain monitoring information about a scene in the online car. In another implementation, the operation event is automatically disclosing private information (e.g., driver information, passenger information, emergency contact information of the driver and/or the passenger, etc.) in the trip order, and sending trip information to a police platform. A second part of the smart contract includes description codes of a trigger event of the smart contract, that is, a trigger condition that triggers performing of the operation event of the first part. In one implementation, the trigger event is detecting that a deviation between an actual driving route and a preset navigation route is greater than a threshold. In another implementation, the trigger event is detecting that monitoring information about a scene in the vehicle contains preset information indicating danger. In another implementation, the trigger event is detecting that an absolute value of acceleration of the online car within a preset time period is greater than another threshold.

In one implementation, after obtaining the trip order, the security monitoring platform automatically generates the description codes of the operation event and the description codes of the trigger event according to the trip order, and then assembles the description codes of the operation event and the description codes of the trigger event into the smart contract. After the smart contract is generated, the smart contract is sent to related participants, and signatures of the participants for the smart contract are then obtained. Thereafter, the smart contract and the signatures of the participants for the smart contract are broadcasted on the entire network. When nodes of the blockchain network reach consensus on the verification of the smart contract, the smart contract and the signatures of the participants for the smart contract are written into the blockchain.

In one implementation, the participants related to the smart contract include a driver, a passenger, and an on-board equipment of the vehicle.

At 102, the security monitoring platform obtains trip data uploaded by an on-board equipment.

In implementations of the present disclosure, after generating the smart contract according to the trip order, the security monitoring platform obtains, with the on-board equipment of a vehicle taken by the passenger, the trip data of the vehicle. As such, the security monitoring platform analyzes the trip data to determine whether the trigger event in the smart contract occurs. If the trigger event occurs, proceed to operations at 103. Otherwise, monitoring is continued.

The trip data herein may include data such as a driving route, speed, and acceleration of a vehicle taken by the passenger.

In one implementation, after detecting that the passenger gets on a vehicle and the vehicle is started, the on-board equipment obtains the trip data of the vehicle, and then uploads the trip data obtained to the security monitoring platform.

In one implementation, the on-board equipment periodically uploads current trip data of the vehicle according to a preset duration. For example, data such as a driving route, speed, and acceleration of the vehicle at a current time point is uploaded every one minute.

At 103, the security monitoring platform triggers the smart contract based on the trip data and the trip order, and performs early-warning which corresponds to the smart contract.

In implementations of the present disclosure, after obtaining the trip data, the security monitoring platform analyzes the trip data in conjunction with the trip order to determine whether a trigger event in the smart contract occurs. If the trigger event occurs, the smart contract is triggered, and an operation event corresponding to the trigger event in the smart contract is performed. The operation event is performing an early-warning operation when the safety monitoring platform determines that the passenger or the driver of the vehicle is in danger. In one implementation, the early-warning operation is sending a monitoring instruction to the on-board equipment, where the monitoring instruction is used to activate a monitoring equipment of the vehicle. In one implementation, the early-warning operation is disclosing private information contained in the trip order and uploading the privacy information and the trip data to a police platform, where the privacy information includes driver information, passenger information, and emergency contact information. In one implementation, the early-warning operation is sending an alarm start instruction to the on-board equipment, where the alarm start instruction is used to instruct the on-board equipment to send warning information to surrounding vehicles.

In one implementation, after obtaining the trip order, the method for data analysis further includes the following. The security monitoring platform receives actual image information of a driver sent by the on-board equipment. The security monitoring platform determines whether the actual image information is consistent with pre-stored image information of the driver, where the pre-stored image information is a pre-stored image of the driver corresponding to driver information contained in the trip order. The security monitoring platform determines whether the actual image information is consistent with the pre-stored image information. If the actual image information is inconsistent with the pre-stored image information, warning information is sent to an electronic device of the passenger. If the actual image information is consistent with the pre-stored image information, proceed to operations at 103.

As can be seen, in the implementations of the present disclosure, a smart contract for automatic early-warning can be generated based on a trip order of a passenger. Trip data of an online car can be obtained in real time. Whether to trigger an event in the smart contract generated is determined based on the real-time trip data and the trip order (i.e., there may be a security risk). If it is determined that there is a security risk, the smart contract is triggered and early-warning corresponding to the smart contract is performed. In this way, a safety risk of the passenger or the driver of the online car can be effectively and timely reduced.

Figure 2:
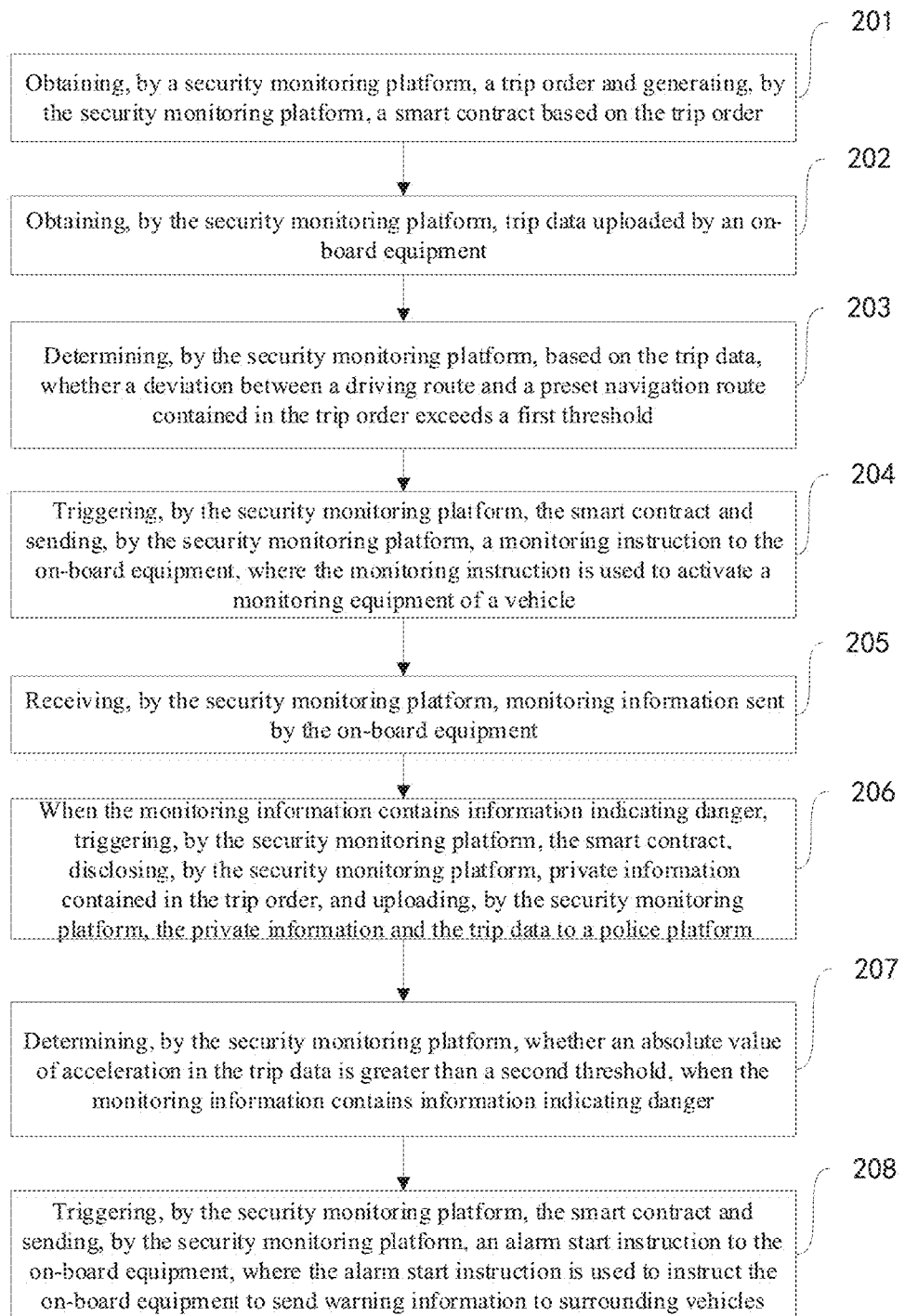
FIG. 2 is a schematic flowchart illustrating a method for data analysis according to some other implementations.

Similar to foregoing implementations described in conjunction with FIG. 1, FIG. 2 is a schematic flowchart illustrating a method for data analysis according to another implementation of the present disclosure. As illustrated in FIG. 2, the method includes the following.

At 201, a security monitoring platform obtains a trip order and generates a smart contract based on the trip order.

At 202, the security monitoring platform obtains trip data uploaded by an on-board equipment.

At 203, the security monitoring platform determines, based on the trip data, whether a deviation between a driving route and a preset navigation route contained in the trip order exceeds a first threshold.

In implementations of the present disclosure, after obtaining the trip data, the safety monitoring platform analyzes the trip data in combination with the trip order to determine whether the deviation between the driving route and the preset navigation route contained in the trip order exceeds the first threshold. If the deviation exceeds the first threshold, proceed to operations at 204. If the deviation fails to exceed the first threshold, return to operations at 202. Relevant operations are continuously performed by referring to the forgoing operations until the trip order are completed.

The preset navigation route includes at least one driving route from a departing place to a destination in the trip order. The trip data all include information such as a location, a driving direction, speed, and acceleration of the vehicle, and other information of the vehicle. In one implementation, after obtaining the trip data, the safety monitoring platform periodically determines whether a location of the vehicle is on the preset navigation route. If yes, the safety monitoring platform waits for a next cycle of detection. If no, the safety monitoring platform obtains a first position that starts to deviate from the preset navigation route, and calculates a deviation distance between the first position and a current position, where the deviation distance is used as the deviation between the driving route and the preset navigation route contained in the trip order. If the deviation distance is greater than the first threshold (e.g., the first threshold is 500 meters), proceed to operations at 204. If the deviation distance is less than or equal to the first threshold, return to operations at 202. It should be understood that, when the vehicle deviates from a first route of the preset navigation route to a second route of the preset navigation route, it is regarded that the location of the vehicle is on the preset navigation route.

For example, if the vehicle starts to deviate from the preset navigation route at position A of the preset navigation route, after leaving position A, whenever the trip data of the vehicle is obtained, the security monitoring platform determines whether current position B of the vehicle is on the preset navigation route. If no, the security monitoring platform calculates a route distance between location A and location B. If the route distance between location A and location B is greater than 500 meters, proceed to operations at 204. If the route distance between location A and location B is not greater than 500 meters, return to operations at 202 continue to obtain the trip data of the vehicle.

At 204, the security monitoring platform triggers the smart contract and sends a monitoring instruction to the on-board equipment, where the monitoring instruction is used to activate a monitoring equipment of a vehicle.

In implementations of the present disclosure, upon determining that the deviation between the driving route and the preset navigation route exceeds the first threshold, the safety monitoring platform triggers the smart contract and sends the monitoring instruction to the on-board equipment, where the monitoring instruction is used to activate the monitoring equipment of the vehicle.

In implementations of the present disclosure, the monitoring equipment may include a voice monitoring equipment and/or a video monitoring equipment.

At 205, the security monitoring platform receives monitoring information sent by the on-board equipment.

In implementations of the present disclosure, when the on-board equipment of the vehicle taken by the passenger receives a monitoring instruction, the monitoring equipment of the vehicle is activated to obtain monitoring information about a scene in the vehicle. Then the monitoring information obtained is uploaded to the security monitoring platform. The monitoring information may include voice information and/or video information.

At 206, when the monitoring information contains information indicating danger, the security monitoring platform triggers the smart contract, discloses private information contained in the trip order, and uploads the private information and the trip data to a police platform, where the private information includes driver information, passenger information, and emergency contact information.

In implementations of the present disclosure, after receiving the monitoring information, the security monitoring platform analyzes contents of the monitoring information to determine whether the contents of the monitoring information contain information indicating danger. If the monitoring information contains information indicating danger, the smart contract is triggered, and the private information contained in the trip order is disclosed, where the private information includes driver information, passenger information, and emergency contact information of the driver and the passenger. If the monitoring information does not contain information indicating danger, return to operations at 205. Relevant operations are continuously performed by referring to the forgoing operations until the trip order is completed. The monitoring information may include video information, picture information and/or voice information about a scene in the vehicle.

In one implementation, taking the monitoring information being video or picture information of a vehicle as an example, after obtaining the video or picture information of the vehicle, the security monitoring platform identifies a driver and/or a passenger in a video or picture of the vehicle, and obtains facial expressions, physical movements, and positions of the driver and/or the passenger in the car. When detecting that the facial expressions of the driver and/or the passenger are preset expressions such us grisly, frightened, or angry, and the physical movements of the driver and/or the passenger are offensive movements, defensive movements, surrender movements, etc., and the positions of the driver and/or the passenger deviate from preset positions (e.g., if a position of the driver deviates from a cab or a position of the passenger is close to the cab, etc.), the security monitoring platform determines that the contents of the monitoring information contains information indicating danger.

In another implementation, taking the monitoring information being voice information as an example, the security monitoring platform performs semantic analysis on the voice information to obtain text information of the voice information, and then determines whether a preset keyword indicating danger appears in the text information (e.g., "Shameless", "Help", etc.). If the preset keyword indicating danger appears, the security monitoring platform determines that the monitoring information contains information indicating danger.

At 207, when the monitoring information contains information indicating danger, the safety monitoring platform determines whether an absolute value of acceleration in the trip data is greater than a second threshold.

In implementations of the present disclosure, when determining that the monitoring information contains information indicating danger after analyzing the monitoring information, the security monitoring platform determines whether the absolute value of the acceleration in the trip data is greater than the second threshold. If yes, proceed to operations at 208. If no, return to operations at 205. Relevant operations are continuously performed by referring to the forgoing operations until the trip order is completed.

In implementations of the present disclosure, whether the vehicle suddenly accelerates or brakes during driving is determined based on sudden acceleration changes, and accordingly, whether the absolute value of the acceleration in the trip data is greater than the second threshold is determined. In some scenarios, when the driver and the passenger have conflicts or disputes during the driving of the vehicle, the vehicle may suddenly decelerate due to sudden braking of the driver, or suddenly accelerate due to accidentally stepping on an accelerator when applying a brake. Considering the above scenarios, when it is determined that there is a danger in the vehicle, whether there is a conflict or dispute between the passenger and the driver in the vehicle can be further determined by determining whether acceleration of the vehicle exceeds a threshold.

At 208, the security monitoring platform triggers the smart contract, and sends an alarm start instruction to the on-board equipment, where the alarm start instruction is used to instruct the on-board equipment to send warning information to surrounding vehicles.

In implementations of the present disclosure, when determining that the monitoring information contains information indicating danger and the absolute value of the acceleration in the trip data is greater than the second threshold, the safety monitoring platform triggers the smart contract and sends the alarm start instruction to the on-board equipment, where the alarm start instruction is used to instruct the on-board equipment to send the warning information to the surrounding vehicles.

In some possible scenarios, for example, a scenario where the passenger finds that a driving route of the vehicle has deviated far from a navigation route (that is, a danger may occur), actions of the passenger such as arguing with the driver or attacking the driver may appear, which may cause the driver to step on a brake urgently. In this case, an absolute value of acceleration of the vehicle obtained by the safety monitoring platform from the uploaded trip data exceeds the second threshold. Upon determining that the absolute value of the acceleration in the trip data is greater than the second threshold, the smart contract is triggered and an alarm start instruction is sent to the on-board equipment. After receiving the alarm start instruction, the on-board equipment sends alarm information for help to surrounding vehicles. The alarm information may be text or voice information. For example, the alarm information is information on "xxx vehicle is in danger and needs your help".

As can be seen, in the implementations of the present disclosure, a smart contract for automatic early-warning can be generated based on a trip order of a passenger. Trip data of an online car can be obtained in real time. Whether to trigger an event in the smart contract generated is determined based on the real-time trip data and the trip order i.e., there may be a security risk). If it is determined that there is a security risk, the smart contract is triggered and early-warning corresponding to the smart contract is performed. In this way, a safety risk of the passenger or the driver of the online car can be effectively and timely reduced.

Figure 3:
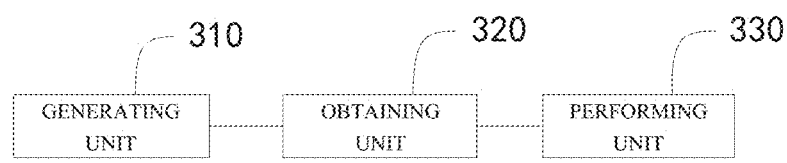
FIG. 3 is a schematic block diagram illustrating an electronic device according to some implementations.

According to implementations of the present disclosure, an electronic device is further provided. The electronic device includes units configured to execute the method of any of the foregoing implementations. FIG. 3 is a schematic block diagram illustrating an electronic device according to some implementations. As illustrated in FIG. 3, the electronic device of this implementation includes a generating unit 310, an obtaining unit 320, and a performing unit 330. The generating unit 310 is configured to obtain a trip order and generate a smart contract based on the trip order. The obtaining unit 320 is configured to obtain trip data uploaded by an on-board equipment. The performing unit 330 is configured to trigger the smart contract based on the trip data and the trip order, and perform early-warning which corresponds to the smart contract.

In one implementation, the performing unit includes a determining subunit and a sending subunit. The determining subunit is configured to determine, based on the trip data, whether a deviation between a driving route and a preset navigation route contained in the trip order exceeds a first threshold. The sending subunit is configured to trigger the smart contract and send a monitoring instruction to the on-board equipment, upon determining that the deviation between the driving route and the preset navigation route exceeds the first threshold, where the monitoring instruction is used to activate a monitoring equipment of a vehicle.

In one implementation, the performing unit further includes a receiving subunit and a disclosing subunit. The receiving subunit is configured to receive monitoring information sent by the on-board equipment. The disclosing subunit is configured to trigger the smart contract and disclosing the trip order, when the monitoring information contains information indicating danger. The sending subunit is further configured to trigger the smart contract and upload the trip order and the trip data to a police platform, when the monitoring information contains information indicating danger.

In one implementation, the determining subunit is further configured to determine whether an absolute value of acceleration in the trip data is greater than a second threshold when the monitoring information contains information indicating danger. The sending subunit is further configured to trigger the smart contract and send an alarm start instruction to the on-board equipment, upon determining that the absolute value of the acceleration in the trip data is greater than the second threshold, where the alarm start instruction is used to instruct the on-board equipment to send warning information to surrounding vehicles.

In one implementation, the electronic device further includes a receiving unit, a determining unit, and a sending unit. The receiving unit is configured to receive actual image information of a driver sent by the on-board equipment. The determining unit is configured to determine whether the actual image information of the driver is consistent with pre-stored image information of the driver, where the pre-stored image information is a pre-stored image of the driver corresponding to driver information contained in the trip order. The sending unit is configured to send warning information to an electronic device of a passenger, upon determining that the actual image information is inconsistent with the pre-stored image information.

As can be seen, in the implementations of the present disclosure, a smart contract for automatic early-warning can be generated based on a trip order of a passenger. Trip data of an online car can be obtained in real time. Whether to trigger an event in the smart contract generated is determined based on the real-time trip data and the trip order (i.e., there may be a security risk). If it is determined that there is a security risk, the smart contract is triggered and early-warning corresponding to the smart contract is performed. In this way, a safety risk of the passenger or the driver of the online car can be effectively and timely reduced.

Figure 4:
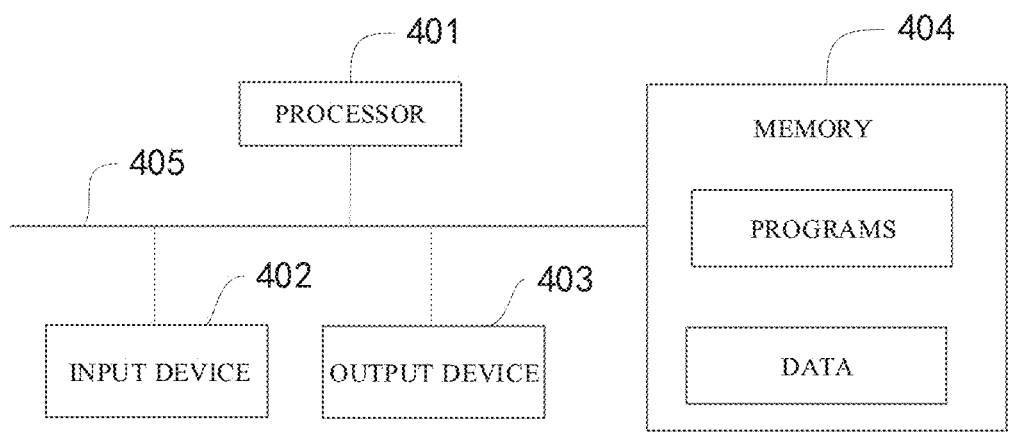
FIG. 4 is a schematic diagram illustrating a device according to some implementations.

FIG. 4 is a schematic diagram illustrating a device according to some implementations. The device may be an electronic device. As illustrated in FIG. 4, the device includes one or more processors 401, one or more input devices 402, one or more output devices 403, and one or more memories 404. The processor 401, the input device 402, the output device 403, and the memory 404 are coupled with each other via a bus 405. The memory 402 is configured to store instructions, and the processor 401 is configured to execute the instructions stored in the memory 402.

Taking an electronic device as an example of the device, the processor 401 is configured to: obtain a trip order and generate a smart contract based on the trip order; obtain trip data uploaded by an on-board equipment; and trigger the smart contract based on the trip data and the trip order and perform early-warning which corresponds to the smart contract.

It should be understood that, in implementations of the present disclosure, the processor 401 may be a central processing unit (CPU). The processor may also be other general-purpose processors or digital signal processors (DSP), application specific integrated circuit (ASIC), field-programmable gate array (FPGA) or other programmable logic devices, discrete or transistor logic devices, discrete hardware components, etc. The general-purpose processor may be a microprocessor, or the processor may be any conventional processor or the like.

The input device 402 may include a touch panel, a fingerprint sensor (configured to collect fingerprint information and fingerprint direction information of a user), a microphone, etc. The output device 403 may include a display (LCD, etc.), a speaker, and the like.

The memory 404 may include a read-only memory (ROM) and a random access memory (RAM). The memory 404 is configured to provide instructions and data to the processor 401. A portion of the memory 404 may include a non-transitory random access memory. For example, the memory 404 may also store device-type information.

In specific implementations, the processor 401, the input device 402, and the output device 403 are configured to execute the method for data analysis described in the first implementation, the second implementation, and the third implementation of the present disclosure, and are also configured to execute the implementation manners of the electronic device described in implementations of the present disclosure, which will not be described in further detail herein.

According to implementations of the present disclosure, a computer readable storage medium is provided. The computer readable storage medium stores computer programs which, when executed by a processor, are operable with the processor to carry out following actions. A trip order is obtained. A smart contract is generating based on the trip order. Trip data uploaded by an on-board equipment is obtained. The smart contract is triggered based on the trip data and the trip order. Early-warning which corresponds to the smart contract is performed.

The computer readable storage medium may be an internal storage unit of the terminal according to any of the foregoing implementations, such as a hard disk or a memory of the terminal. The computer readable storage medium may also be an external storage device of the terminal, for example, a plug-in hard disk equipped on the terminal, a smart media card. (SMC), a secure digital (SD) card, a flash card, etc. Further, the computer readable storage medium may also include both the internal storage unit of the terminal and the external storage device. The computer readable storage medium is configured to store computer programs and other programs and data required by the terminal. The computer readable storage medium may also be used to temporarily store data that has been or will be output.

Those of ordinary skill in the art may realize that the example units and algorithm steps described in conjunction with the implementations disclosed herein can be implemented by electronic hardware, computer software, or a combination of the two, in order to clearly explain the hardware and software interchangeability, in the above description, the composition and operations of each example have been generally described according to function. Whether these functions are executed in hardware or software depends on the specific application of the technical solution and design constraints. Professional technicians can use different methods to implement the described functions for each specific application, but such implementation should not be considered beyond the scope of this disclosure.

Those skilled in the art can clearly understand that, for the convenience and conciseness of description, the specific working process of the system, the electronic device, and units described above can refer to the corresponding process in the foregoing method implementations, and details are not repeated herein.

In the implementations of the present disclosure, it should be understood that, the system, the electronic device, and the method disclosed in implementations provided herein may be implemented in other manners. For example, the device/apparatus implementations described above are merely illustrative; for instance, the division of the unit is only a logical function division and there can be other manners of division during actual implementations, for example, multiple units or assemblies may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, mechanical connection, or other forms of connection.

The units described as separate components may or may not be physically separated, the components illustrated as units may or may not be physical units, that is, they may be in the same place or may be distributed to multiple network elements. Part or all of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the operations described in the various implementations of the present disclosure. The memory includes various medium capable of storing program codes, such as a universal serial bus (USB), a mobile hard disk, a ROM, a RAM, Disk, compact disc (CD), or the like.

It should be noted that the foregoing implementations are merely used to illustrate the technical solutions of the present disclosure rather than limiting the present disclosure. Any modifications, equivalent substitutions, or improvements that can be easily thought of by those skilled in the art without departing from the spirits and principles of the present disclosure shall all be encompassed within the protection of the present disclosure. Therefore, the protection of the present disclosure depends on the protection of the claims.

What is claimed is:

1. A method for data analysis, comprising:
obtaining a trip order and generating a smart contract based on the trip order;
obtaining trip data uploaded by an on-board equipment; and
triggering the smart contract based on the trip data and the trip order, and performing early-warning which corresponds to the smart contract,
wherein the triggering the smart contract based on the trip data and the trip order and the performing the early-warning which corresponds to the smart contract comprise:
determining, based on the trip data, whether a deviation between a driving route and a preset navigation route contained in the trip order exceeds a first threshold; and
upon determining that the deviation between the driving route and the preset navigation route exceeds the first threshold, triggering the smart contract and sending a monitoring instruction to the on-board equipment, wherein the monitoring instruction is used to activate a monitoring equipment of a vehicle, and
wherein the method further comprises the following after sending the monitoring instruction to the on-board equipment:
receiving monitoring information sent by the on-board equipment;
determining, according to the monitoring information received, whether the monitoring information contains information indicating danger; and
upon determining that the monitoring information contains information indicating danger, triggering the smart contract, disclosing private information contained in the trip order, and uploading the private information and the trip data to a police platform, wherein the private information comprises driver information, passenger information, and emergency contact information.

2. The method of claim 1, further comprising:
determining whether an absolute value of acceleration in the trip data is greater than a second threshold, upon determining that the monitoring information contains information indicating danger; and
upon determining that the absolute value of the acceleration in the trip data is greater than the second threshold, triggering the smart contract and sending an alarm start instruction to the on-board equipment, wherein the alarm start instruction is used to instruct the on-board equipment to send warning information to surrounding vehicles.

3. The method of claim 1, further comprising the following after obtaining the trip order:
receiving actual image information of a driver sent by the on-board equipment;
determining whether the actual image information is consistent with pre-stored image information of the driver, wherein the pre-stored image information is a pre-stored image of the driver corresponding to driver information contained in the trip order; and
sending warning information to an electronic device of a passenger, upon determining that the actual image information is inconsistent with the pre-stored image information.

4. The method of claim 1, wherein the monitoring information is embodied as voice information, and determining, according to the monitoring information received, whether the monitoring information contains information indicating danger comprises:
obtaining text information by performing semantic analysis on the voice information;
determining whether the text information contains a preset keyword indicating danger;
determining that the monitoring information contains information indicating danger, upon determining that the text information contains the preset keyword indicating danger; and
determining that the monitoring information does not contain information indicating danger, upon determining that the text information fails to contain the preset keyword indicating danger.

5. An electronic device, comprising:
a memory storing program codes;
a processor configured to call the program codes; and
a communication module;
the program codes, when executed by the processor, cause the processor to:
obtain a trip order and generate a smart contract based on the trip order;
obtain trip data uploaded by an on-board equipment; and
trigger the smart contract based on the trip data and the trip order, and perform early-warning which corresponds to the smart contract,
wherein the processor caused to trigger the smart contract based on the trip data and the trip order, and perform the early-warning which corresponds to the smart contract is caused to:
determine, based on the trip data, whether a deviation between a driving route and a preset navigation route contained in the trip order exceeds a first threshold; and
upon determining that the deviation between the driving route and the preset navigation route exceeds the first threshold, trigger the smart contract and send a monitoring instruction to the on-board equipment, wherein the monitoring instruction is used to activate a monitoring equipment of a vehicle, and
wherein the processor is further caused to:
after sending the monitoring instruction to the on-board equipment:
receive monitoring information sent by the on-board equipment;
determine, according to the monitoring information received, whether the monitoring information contains information indicating danger; and
upon determining that the monitoring information contains information indicating danger, trigger the smart contract, disclose private information contained in the trip order, and upload the private information and the trip data to a police platform, wherein the private information comprises driver information, passenger information, and emergency contact information.

6. The electronic device of claim 5, wherein the monitoring information is embodied as voice information, and the processor caused to determine, according to the monitoring information received, whether the monitoring information contains information indicating danger is caused to:
obtain text information by performing semantic analysis on the voice information;
determine whether the text information contains a preset keyword indicating danger;

determine that the monitoring information contains information indicating danger, upon determining that the text information contains the preset keyword indicating danger; and determine that the monitoring information does not contain information indicating danger, upon determining that the text information fails to contain the preset keyword indicating danger.

7. The electronic device of claim 5, wherein the processor is further caused to:

determine whether an absolute value of acceleration in the trip data is greater than a second threshold, upon determining that the monitoring information contains information indicating danger; and upon determining that the absolute value of the acceleration in the trip data is greater than the second threshold, trigger the smart contract and send an alarm start instruction to the on-board equipment, wherein the alarm start instruction is used to instruct the on-board equipment to send warning information to surrounding vehicles.

8. The electronic device of claim 5, wherein the processor is further caused to:

after obtaining the trip order:

receive actual image information of a driver sent by the on-board equipment;

determine whether the actual image information is consistent with pre-stored image information of the driver, wherein the pre-stored image information is a pre-stored image of the driver corresponding to driver information contained in the trip order; and send warning information to the electronic device of a passenger, upon determining that the actual image information is inconsistent with the pre-stored image information.

9. A non-transitory computer readable storage medium, storing computer programs comprising program instructions which, when executed by a processor, cause the processor to carry out actions, comprising:

obtaining a trip order and generating a smart contract based on the trip order;

obtaining trip data uploaded by an on-board equipment; and triggering the smart contract based on the trip data and the trip order, and performing early-warning which corresponds to the smart contract, wherein the program instructions executed by the processor to carry out the action of triggering the smart contract based on the trip data and the trip order, and performing the early-warning which corresponds to the smart contract are executed by the processor to carry out actions, comprising: determining, based on the trip data, whether a deviation between a driving route and a preset navigation route contained in the trip order exceeds a first threshold; and upon determining that the deviation between the driving route and the preset navigation route exceeds the first threshold, triggering the smart contract and sending a monitoring instruction to the on-board equipment, wherein the monitoring instruction is used to activate a monitoring equipment of a vehicle, and wherein the program instructions, when executed by the processor, are further configured to carry out actions, comprising:

receiving monitoring information sent by the on-board equipment;

determining, according to the monitoring information received, whether the monitoring information contains information indicating danger; and upon determining that the monitoring information contains information indicating danger, triggering the smart contract, disclosing private information contained in the trip order, and uploading the private information and the trip data to a police platform, wherein the private information comprises driver information, passenger information, and emergency contact information.

10. The non-transitory computer readable storage medium of claim 9, wherein the monitoring information is embodied as voice information, and the program instructions executed by the processor to carry out the action of determining, according to the monitoring information received, whether the monitoring information contains information indicating danger are executed by the processor to carry out actions, comprising:

obtaining text information by performing semantic analysis on the voice information;

determining whether the text information contains a preset keyword indicating danger;

determining that the monitoring information contains information indicating danger, upon determining that the text information contains the preset keyword indicating danger; and determining that the monitoring information does not contain information indicating danger, upon determining that the text information fails to contain the preset keyword indicating danger.

11. The non-transitory computer readable storage medium of claim 9, wherein the program instructions, when executed by the processor, are further configured to carry out actions, comprising:

determining whether an absolute value of acceleration in the trip data is greater than a second threshold, upon determining that the monitoring information contains information indicating danger; and upon determining that the absolute value of the acceleration in the trip data is greater than the second threshold, triggering the smart contract and sending an alarm start instruction to the on-board equipment, wherein the alarm start instruction is used to instruct the on-board equipment to send warning information to surrounding vehicles.

12. The non-transitory computer readable storage medium of claim 9, wherein the program instructions, when executed by the processor, are further configured to carry out actions, comprising:

after obtaining the trip order:

receiving actual image information of a driver sent by the on-board equipment;

determining whether the actual image information is consistent with pre-stored image information of the driver, wherein the pre-stored image information is a pre-stored image of the driver corresponding to driver information contained in the trip order; and sending warning information to an electronic device of a passenger, upon determining that the actual image information is inconsistent with the pre-stored image information.

* * * * *